(12) United States Patent
Mills et al.

(10) Patent No.: US 10,395,498 B2
(45) Date of Patent: Aug. 27, 2019

(54) FIRE DETECTION APPARATUS UTILIZING A CAMERA

(71) Applicants: Russell P Mills, Coraopolis, PA (US); Gustavo K Rohde, Pittsburgh, PA (US); Frederick Lanni, Pittsburgh, PA (US); Stephen C Davis, Jr., Allison Park, PA (US)

(72) Inventors: Russell P Mills, Coraopolis, PA (US); Gustavo K Rohde, Pittsburgh, PA (US); Frederick Lanni, Pittsburgh, PA (US); Stephen C Davis, Jr., Allison Park, PA (US)

(73) Assignee: Smoke Detective, LLC, Pittsburgh, PA (US)

( * ) Notice: Subject to any disclaimer, the term of this patent is extended or adjusted under 35 U.S.C. 154(b) by 496 days.

(21) Appl. No.: 14/625,689

(22) Filed: Feb. 19, 2015

(65) Prior Publication Data
US 2016/0247375 A1 Aug. 25, 2016

(51) Int. Cl.
*G08B 17/12* (2006.01)
*G06K 9/46* (2006.01)
*H04N 7/18* (2006.01)
*G06K 9/00* (2006.01)

(52) U.S. Cl.
CPC ....... *G08B 17/125* (2013.01); *G06K 9/00771* (2013.01); *G06K 9/4609* (2013.01); *H04N 7/183* (2013.01)

(58) Field of Classification Search
None
See application file for complete search history.

(56) References Cited

U.S. PATENT DOCUMENTS

| 5,656,813 | A | * | 8/1997 | Moore | G01N 21/3504 |
|||||| 250/330 |
| 5,926,280 | A | | 7/1999 | Yamagishi et al. | |
| 7,245,315 | B2 | | 7/2007 | Sadok | |
| 7,256,818 | B2 | * | 8/2007 | Sadok | G08B 17/125 |
|||||| 340/578 |
| 7,280,696 | B2 | * | 10/2007 | Zakrzewski | G06K 9/00771 |
|||||| 382/218 |

(Continued)

OTHER PUBLICATIONS

International Searching Authority; International Search Report and Written Opinion of the International Searching Authority; International Application No. PCT/US2016/017067; Patent Cooperation Treaty; pp. 1-11; publisher United States International Searching Authority; Published Alexandria, Virginia, US; copyright and dated Apr. 13, 2016; (11 pages).

(Continued)

*Primary Examiner* — Mohammad J Rahman

(57) ABSTRACT

A fire detection device is provided that has a camera that captures a reference image and a measured image. A processor compares intensity of the measured image to intensity of the reference image and uses this comparison to determine if an alarm is generated to indicate the presence of fire. The intensity of the measured image may be the total number of photons of the measured image, and the intensity of the reference image may be the total number of photons of the reference image. In other arrangements, the intensity may be measured between individual corresponding pixels of the reference and measured images.

18 Claims, 9 Drawing Sheets

(56) References Cited

U.S. PATENT DOCUMENTS

| | | | |
|---|---|---|---|
| 7,456,749 | B2 | 11/2008 | Anderson |
| 7,495,573 | B2 | 2/2009 | Tice et al. |
| 7,609,856 | B2 | 10/2009 | Chen |
| 7,804,522 | B2 | 9/2010 | Haynes |
| 8,754,942 | B2 | 6/2014 | Hanses et al. |
| 8,804,119 | B2 | 8/2014 | Knox |
| 8,947,508 | B2 | 2/2015 | Morimitsu |
| 9,025,144 | B2 * | 5/2015 | Knox .................. G01N 15/06 356/338 |
| 2002/0024446 | A1 | 2/2002 | Grech-Cini |
| 2002/0135490 | A1 * | 9/2002 | Opitz ............. G08B 13/19602 340/628 |
| 2004/0145482 | A1 * | 7/2004 | Anderson ........... G08B 17/125 340/578 |
| 2005/0069207 | A1 * | 3/2005 | Zakrzewski ....... B64D 45/0015 382/190 |
| 2005/0103506 | A1 * | 5/2005 | Warrack .............. A62C 3/0271 169/43 |
| 2005/0111696 | A1 * | 5/2005 | Baer ..................... H04N 7/188 382/103 |
| 2006/0115154 | A1 * | 6/2006 | Chen .................. G08B 29/186 382/181 |
| 2006/0202847 | A1 | 9/2006 | Oppelt |
| 2007/0018071 | A1 | 1/2007 | Haynes |
| 2008/0111701 | A1 | 5/2008 | Huang |
| 2009/0123074 | A1 | 5/2009 | Chen et al. |
| 2009/0315722 | A1 * | 12/2009 | Hou .................... G08B 17/125 340/578 |
| 2010/0002104 | A1 | 1/2010 | On |
| 2011/0058167 | A1 * | 3/2011 | Knox ..................... G01N 15/06 356/338 |
| 2014/0022385 | A1 | 1/2014 | Fischer |
| 2014/0022547 | A1 | 1/2014 | Knox et al. |
| 2014/0203939 | A1 * | 7/2014 | Harrington ........... H04M 11/04 340/584 |
| 2014/0323106 | A1 * | 10/2014 | Nunally .................. H04W 4/21 455/414.1 |
| 2015/0160175 | A1 * | 6/2015 | Knox ..................... G01N 21/49 340/630 |
| 2015/0169984 | A1 | 6/2015 | Newton et al. |
| 2015/0213698 | A1 | 7/2015 | Peters et al. |
| 2016/0260306 | A1 * | 9/2016 | Jackel ................. G08B 17/005 |

OTHER PUBLICATIONS http://www.fike.com/products/spyderguard-video-flame-smoke-detection-monitoring-software/, last accessed Jan. 12, 2016.

Signifire, product brochure, by Fike, Corp., 2014.

Signifire Spyder Guard data sheet, by Fike Corp., Aug. 2010.

http://www.asl-systems.com/products.html, last accessed Jan. 12, 2016.

http://www.firevu.com/, last accessed Jan. 12, 2016.

http://www.det-tronics.com/Pages/Home.aspx, last accessed Jan. 12, 2016.

http://www.notifier.com/swift/Pages/default.aspx, last access Jan. 12, 2016.

SWIFT Intelligent Wireless Detectors, product sheet, 2015 by Honeywell International, Inc.

SWIFT FWSG Flashscan Wireless Gateway, product sheet, 2015, by Honeywell International, Inc.

SWIFT Intelligent Wireless Modules, product sheet, 2015, by Honeywell International, Inc.

Yu Chunyu; titled "Video Fire Smoke Detection Using Motion and Color Features"; Fire Technology, 2010, pp. 651-663, vol. No. 46; publisher Springer Science + Business Media, LLC; copyright date of 2009 by Springer Science + Business Media, LLC; published in USA; (13 pages).

I Kolesov; titled "Fire and Smoke Detection in Video with Optimal Mass Transport Based Optical Flow and Neural Networks"; Proceedings of 2010 IEEE 17$^{th}$ International Conference on Image Processing; Sep. 26-29, 2010: pp. 761-764; ICIP 2010; Hong Kong; (4 pages).

Hongda Tian: titled "Smoke Detection in Video: An Image Separation Approach": Int J Comput Vis; 1014; pp. 192-209; vol. No. 106; publisher Springer Science + Business Media: copyright 2013 Springer Science + Business Media; published in New York, USA; (16 pages).

International Searching Authority; International Search Report and Written Opinion of the International Searching Authority; International Application No. PCT/US2017/039691; Patent Cooperation Treaty; pp. 1-13; publisher United States International Searching Authority; Published Alexandria, Virginia, US; copyright dated Sep. 8, 2017; (13 pages).

* cited by examiner

|  |  |  |  |
|---|---|---|---|
| 68<br>20 | 70<br>10 | 72<br>40 | 74<br>70 |
| 76<br>50 | 78<br>80 | 80<br>100 | 82<br>20 |
| 84<br>30 | 86<br>30 | 88<br>90 | 90<br>130 |

66 → REFERENCE

*FIG. 3*

|  |  |  |  |
|---|---|---|---|
| 68<br>10 | 70<br>10 | 72<br>30 | 74<br>90 |
| 76<br>60 | 78<br>70 | 80<br>150 | 82<br>80 |
| 84<br>50 | 86<br>40 | 88<br>170 | 90<br>200 |

66 → MEASURED

*FIG. 4*

|  |  |  |  |
|---|---|---|---|
| 68<br>-10 | 70<br>0 | 72<br>-10 | 74<br>20 |
| 76<br>10 | 78<br>-10 | 80<br>50 | 82<br>60 |
| 84<br>20 | 86<br>10 | 88<br>80 | 90<br>70 |

66 → MEASURED - REFERENCE

*FIG. 5*

FIRE DETECTION APPARATUS UTILIZING A CAMERA

FIELD OF THE INVENTION

The present invention relates generally to a fire detection device that employs a camera and a light for use in detecting fire. More particularly, the present application relates to a fire detection device that can be mobile and taken by the user to different locations that uses an analysis of different frames of the camera to determine whether smoke is present.

BACKGROUND

Devices for the automatic detection of a fire are valuable because it is impossible for humans to be aware of their surroundings all of the time. Standard smoke detectors are known and can be one of several different types. For example, photoelectric smoke detectors are known that make use of a light beam and a light sensor capable of detecting the light beam. When smoke is not present, the light beam shines past the light sensor and does not contact the light sensor and the alarm is not activated. However, when smoke fills up a chamber through which the light beam travels, the light beam engages the smoke and is deflected or scattered some amount resulting in it engaging the sensor and being detected by the sensor. The alarm will then activate to warn people nearby of the presence of smoke, and hence fire. Other types of traditional smoke detectors utilize an ionization chamber and a source of ionizing radiation to detect smoke.

Fire detection devices are known that capture an image and then analyze the image in order to determine if flame is present in the image. One such device analyzes an image by looking at the intensity of the red, green, and blue color components of the image. Artificial light in the image is noted to exhibit only high luminance levels of the red component. These artificial sources of light may be tail lamps and headlights of vehicles. However, a flame that is present in the image will generate high luminance levels of both red and green components. In this manner, the fire detection device is able to analyze the color components of an image to determine if a flame is present, and to exclude other non-flame sources of illumination when detecting the fire.

A different fire detection device that makes use of image processing receives image data and then sends this image data to a fire detection module for detecting fire or signs of fire. Abstract information from the image such as texture, intensity, and color is evaluated. Object detection or segmentation is preferably not performed. The system uses a camera mounted onto the ceiling and has a field of view that extends along the ceiling but is not pointed downwards to the floor. A blinder or other blocking mechanism is used to prevent the camera from imaging the floor. This arrangement causes the system to focus only on the area of the ceiling where smoke will be detected, and to ignore movement on the floor that would otherwise confuse the system.

Additional fire detection systems have been proposed that seek to incorporate fire detection capabilities into a security system that uses imaging so that two separate systems, security and fire detection, can be combined into one for cost and utility savings. A beam of light is projected within the field of view of the camera, and changes in the light beam brought about by the presence of smoke will be detected by the system in order to alert the operator of the presence of fire.

There continues to be a need for devices that are capable of detecting the presence of fire and alerting people in order to provide them with adequate time to escape or put out the fire. Such a device should be mobile so that the user can take it with him or her when traveling and sleeping overnight in places that may or may not be equipped with smoke detectors. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 3 is a top plan view of an array of pixels that receive light during a reference stage.

FIG. 4 is a top plan view of the array of pixels of FIG. 3 that receive light during a measurement stage.

FIG. 5 is a top view of the difference of the light intensity of the pixels between the reference and measurement stages of FIGS. 3 and 4.

Figure 1:
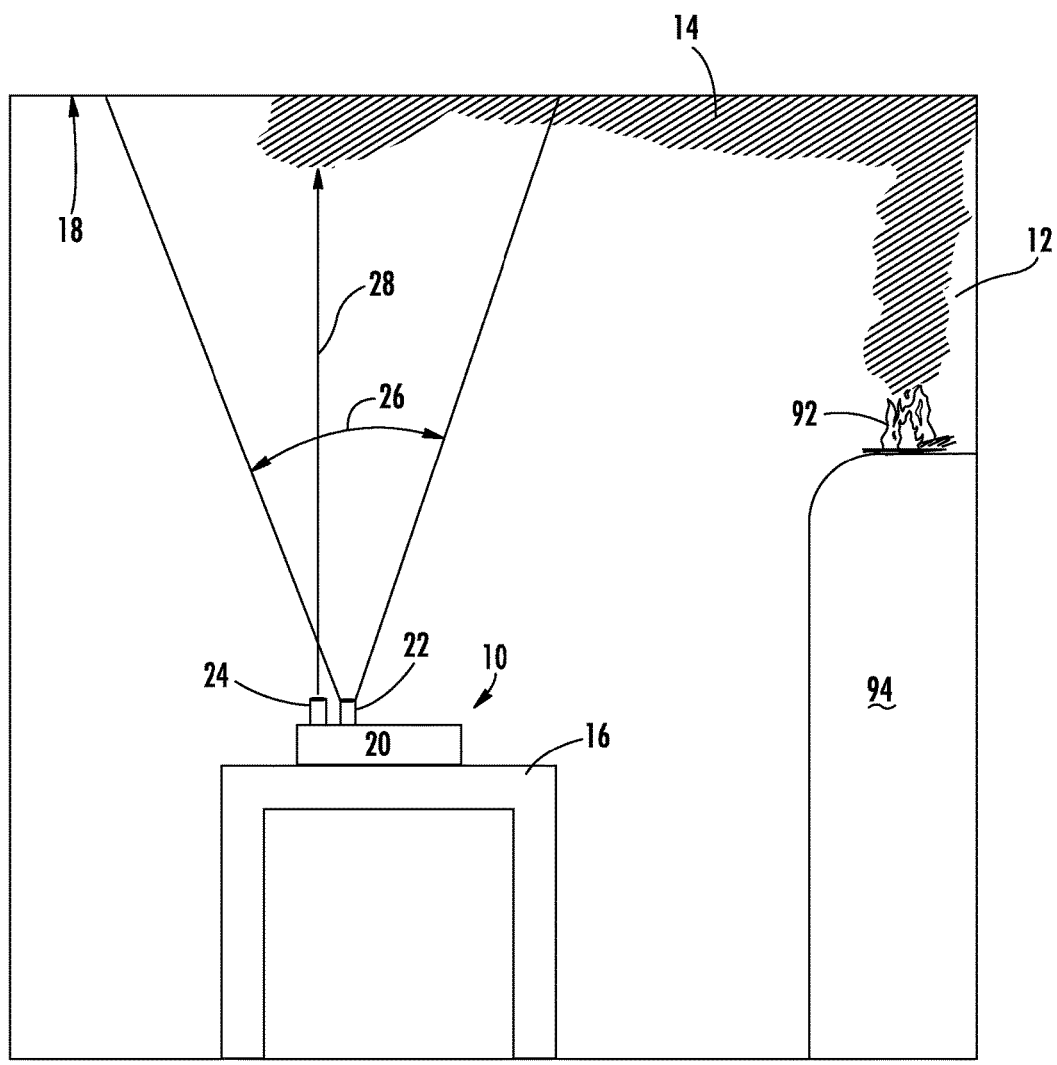
FIG. 1 is a side elevation view of a fire detection device located in a room in which smoke is present at the ceiling of the room.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a fire detection device 10 that may employ a camera 22 in order to detect a fire 92 in a room 12 of a building. The fire detection device 10 makes use of a reference image and then compares subsequent images taken by the camera 22 and compares same to the reference image to determine whether a fire 92 is present. The fire detection device 10 may identify the presence of fire 92 through the identification of the flames themselves, or from smoke 14 produced from the fire 92, The fire detection device 10 may have a light 24 that illuminates the room 12 to aid the camera 22 in capturing the sequential images. The fire detection device 10 may be incorporated into a smart phone, cell phone, PDA, or other handheld communication device, or the fire detection device 10 may be a dedicated, stand alone device. Although providing benefit when sleeping in a location that does not have its own smoke detectors, the hand held device 10 may be used as a back-up device or can be used at any time or location and need not be only employed when the user is sleeping in other arrangements.

With reference now to FIG. 1, the fire detection device 10 is located inside of a room 12 of a building, A fire 92 has started on top of a stand 94 in the room 12, and smoke 14 is produced from the fire 92 and has risen to the ceiling 18 of the room 12. Depending upon the pattern of air flow in the room 12, the smoke 14 may or may not flow onto the ceiling 18, and may or may not cover all of the ceiling 18. However, it is generally the case that the smoke 14 from a fire 92 will rise and cover some portion of the ceiling 18 and will generally be at the highest portion of the room 12. The fire detection device 10 is placed on the upper surface of a table 16 that is located inside of the room 12. The fire detection device 10 has a light source 24 that emits a light 28 upwards to hit the ceiling 18, The light 28 will illuminate the smoke 14 as it shines through the smoke 14 to cause particles in the smoke 14 such as soot and ash to be better visible to the camera 22 of the fire detection device 10. The camera 22 has a field of view 26 that is likewise directed to the ceiling 18 of the room 12 and can more easily capture an image of the smoke 14 due to illumination by the light 28. It is therefore the case that the light 28 can be located within the field of view 26 of the camera 22, and that both the light 28 and field of view 26 are directed upwards to the ceiling 18. However, it is to be understood that in accordance with other exemplary embodiments that the light 28 and the field of view 26 need not be directed onto the ceiling 18. For example, in some arrangements of the fire detection device 10, these elements 28 and 26 may be directed to a wall of the room 12, or to the floor of the room 12, object in the room 12, to a window of the room 12, or to some combination of the ceiling 18, floor, wall, object or window.

The camera 22 may be arranged close to the light source 24 so that there is very little distance between the portion of the light source 24 from which the light 28 emanates and the portion of the camera 22 from which the field of view 26 emanates. The distance between these two portions may be from 0.1 to 0.4 centimeters, from 0.4 to 0.8 centimeters, from 0.8 to 2.0 centimeters, from 2.0 to 2.5 centimeters, from 2.5 to 3.0 centimeters, or up to 10 centimeters. In other exemplary embodiments, the distance may be up to 20 centimeters, up to 50 centimeters, or up to 1000 centimeters. The camera 22 and light source 24 may be arranged so that no distance is between them such that a single device provides both of their functionality. The camera 22 may be arranged so that the field of view 26 and the light 28 overlap at some point either during the entire sequence of measurement, or during a portion of the measuring sequence of the device 10. Positioning of the camera 22 and the light source 24 close to one another may reduce or eliminate the presence of shadows that the smoke 14 may cast onto the ceiling 18. Close positioning of these components may cause the smoke 14 to be more brightly illuminated by the light 28 so that the camera 22 can pick up the presence of the smoke 14 as a bright image without the presence of, or minimization of, shadows and darkness caused by the smoke 14, It is to be understood that as used herein the term "smoke" 14 is broad enough to include ash, soot, burning debris, and any other byproduct of combustion caused by a fire 92. The fire 92 may include any type of flame, or may be a smoldering fire that does not necessarily have flame visible but that does create smoke 14.

Figure 2:
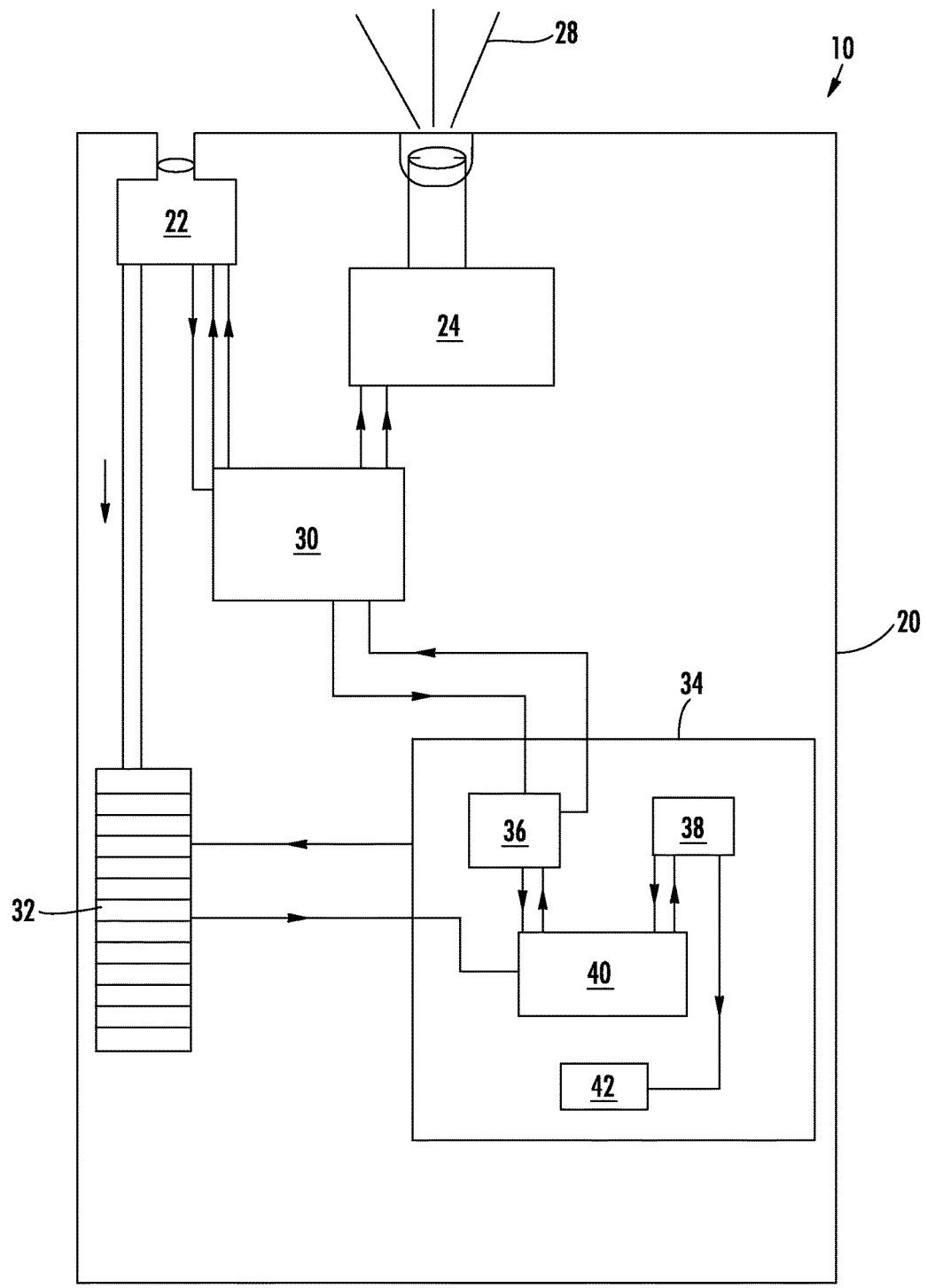
FIG. 2 is a schematic view of a fire detection device in accordance with one exemplary embodiment.

FIG. 2 shows the fire detection device 10 in greater detail. The fire detection device 10 may include a housing 20 into which various components of the fire detection device 10 are housed. All of the components of the fire detection device 10 may be inside of the housing 20, or some of the components may be inside of the housing 20 while other components are located remote from the housing 20 and are not carried by, and do not engage the housing 20, A light source 24 may be included and may be capable of generating a light 28 that is made of a single beam or multiple beams. The light source 24 may be a flash on a camera in accordance with certain exemplary embodiments, and may be a flash or light on a smart phone in some arrangements of the fire detection device 10. The light source 24 is arranged so that the light 28 is not blocked by the housing 20, and portions of the light source 24 may extend through an aperture of the housing 20 or the entire light source may be located outside of the housing 20 and not covered by the housing 20.

A camera 22 is carried by the housing 20 and may likewise be completely located outside of the housing 20, completely inside of the housing 20, or partially inside and outside of the housing 20. The camera 22 may be completely inside of the housing 20, and a lens of the camera 22 may receive light from outside of the housing 20 via an aperture that extends through the housing 20. An internal timer and control 30 may be in communication with both the camera 22 and the light source 24 in order to send instructions to both in order to tell both when and how to actuate. For example, the light source 24 may be instructed to flash one or more times in sequence and the intensity and length of each of the flashes may be ordered by the internal timer and control 30, In a similar manner, the camera 22 may be instructed by the internal timer and control 30 as to when to capture an image, whether to focus or not focus, what shutter speed to use, whether to take a color or black and white image, and whether to take video footage or still images. The camera 22 may be instructed by the internal timer and control 30 to manipulate the flash intensity of the light source 24 so that the device 10 may function in a dark room without producing too much light that would be a nuisance to someone trying to sleep. The flash intensity could also be varied or controlled in other situations as needed or desired by the device 10. The internal timer and control 30 may be capable of instructing the camera 22 and the light source 24 to record an image that is illuminated when the light source 24 lights so that the picture is timed with the flash. Information or instructions from the camera 22 may be communicated to the internal timer and control 30, The fire detection device 10 may thus be capable of adjusting the shutter speed, image focusing, light to flash, and other variables associated with the camera 22.

The fire detection device 10 may also include an internal image memory 32 that receives information from the camera 22. The image data may be completely digital in certain exemplary embodiments such that no analog image data is received or used at all by the fire detection device 10 at any point from the light entering the lens of the camera 22 onward. The image data can be stored in the internal image memory 32 and may be transferred to a processor 34 of the fire detection device 10. In a similar manner, the processor 34 may communicate with the internal image memory 32 in order to instruct the internal image memory 32 to do certain things such as sending or removing data within the internal image memory 32.

The processor 34 may have various modules that perform different functions. For example, the processor 34 may have a camera and flash module 36 that sends information to and receives information from the internal timer and control 30. The camera and flash module 36 may be part of an algorithm that controls the fire detection device 10 and causes it to function to detect the fire 92. The camera and flash module 36 may send signals to the internal timer and control 30 to cause it to generate light 28 and the camera 22 to capture the image. Likewise, particulars about the light 28 and the camera 22 can be sent to the camera and flash module 36 via the internal timer and control 30 to inform the module 36 when pictures are being taken and when the light 28 is being emitted.

The processor 34 may also include an image comparator module 40 that can receive information from the internal image memory 32 that can compare the different images to one another or to a reference image. These comparisons can be sent to an image analyzer module 38 that can analyze the various comparisons in order to determine if a fire 92 is taking place or is not taking place. The image comparator 40 may send and receive information to and from the camera and flash module 36 and the image analyzer 38. If the image analyzer module 38 determines that a fire 92 is taking place, the image analyzer module 38 may send a command to an alarm module 42 that in turn causes an alarm to be generated by the fire detection device 10. The alarm may be a sounds alarm, a vibration alarm, or a visual alarm or may include any combination of the three. Additional alarm types are possible in other exemplary embodiments, and the fire detection device 10 can generate any type of alarm for informing the user that a fire 92 is taking place. For example, the alarm can be the sending of a message, such as a telephone call, text message, email, or other message, to a 911 emergency center, a fire department, a hotel front desk, or a monitoring service associated with the device. The alarm module 42 need not be present in other arrangements. Instead, the image analyzer module 38 of the processor 34 may cause the alarm to be directly generated such that the fire detection module 10 makes a sound, vibration, and/or visual warning to signal an alert of a fire 92.

The camera 22 may be a digital camera that directly samples the original light that bounces off of the subject of interest (smoke 14 or ceiling 18) and that breaks the sampled light down into a series of pixel values. The light 28 is used to illuminate the smoke 14 to image the smoke 14, and the light 28 itself is not analyzed as a beam. The digital camera 22 may include a series of photosites (pixels) that each detect the amount of incident light (number of incident photons) and store that as one electron charge per detected photon. The amount of charge in each pixel is subsequently converted into a proportional digital count by an A-to-D converter. The number of photons of light that are imparted onto each photosite thus may be counted and this number may in turn be used to represent the intensity of the light striking that particular photosite. In this manner, the amount of light striking each pixel element on the surface of the camera 22 can be measured and analyzed. In this application, we refer to the camera digital output generally as "photons", "photon count", "light intensity", or "digital count" interchangeably.

With reference now to FIG. 3, a pixel array 66 of the camera 22 is shown in which twelve pixels are illustrated. In reality, the pixel array 66 can be composed of millions of pixels and thus it is to be understood that the pixel array 66 illustrated is greatly simplified for sake of discussion relative to the fire detection device 10.

The camera 22 may be, for example, an 8-bit device in which light intensity values are digitized from 0-255. Alternatively, the camera may have 12-bit or greater precision, or may be a color camera producing, for example, 24-bit RGB data. For purposes of illustration, 8-bit data is assumed. A digital count of 20 may correspond to a few hundred photons. A light intensity of 21 is higher than a light intensity of 20 and thus represents more photons than a light intensity of 20. It is to be understood that the numbers used herein are only exemplary in describing one or more embodiments of the device 10. The first pixel 68 is shown as having a light intensity of 20. In other words the photons captured by the first pixel 68 in the image obtained by the camera 22 are represented by a digital count of 20. As stated, it may be the case that several hundred photons were in reality captured to produce the count "20." The number 20 is simply used for sake of convenience and in accordance with standard optical practices in some known devices. The second pixel 70 is located next to the first pixel 68 and has a light intensity of 10 which also is the number of photons captured by the second pixel 70 when obtaining the image. The additional pixels are designated as the third pixel 72, fourth pixel 74, fifth pixel 76, sixth pixel 78, seventh pixel 80, eighth pixel 82, ninth pixel 84, tenth pixel 86, eleventh pixel 88, and twelfth pixel 90 and all likewise have a particular light intensity measurement value that is shown within their respective boundaries. Again, as previously stated the actual number of photons may be of course greater than 10, 40, 70, etc., but are listed as being these numbers for sake of example, and in accordance with optical imaging standards. The fire detection device 10 may capture an image and designate this image as a reference image. The pixel array 66 of FIG. 3 may be an example of the reference image captured by the fire detection device 10. As previously mentioned the image comparator module 40 may obtain this image and designate it as the reference image.

The camera and flash module 36 may cause the internal timer and control 30 to obtain another image by actuating the camera 22 and the light source 24 at some point in time after the reference image is obtained. This time may be from 1 to 3 seconds, from 3 to 6 seconds, from 6 to 10 seconds, or up to 1 minute of time. FIG. 4 shows the photo array 66 of FIG. 3 some amount of time after the reference image of FIG. 3. The photo array 66 of FIG. 4 may be identified as a measured image. The image that is measured at the measured image may be different in some respects from the image that is measured in the reference image. As shown in FIG. 4, the image has changed in that the first pixel 68 now has a measured light intensity of 10 instead of 20 from that in FIG. 3. As a fewer number of photons have been captured by the first pixel 68 during this image, it means that the image is darker in this portion in the measured image than in the reference image. The second pixel 70 has a measured value of 10 which is the same as that of the second pixel 70 in the reference image of FIG. 3, and this signifies the fact that the image has not changed at all between the reference and measured images at the second pixel 70.

Other pixels in the measured image of FIG. 4 show an increase in light intensity that signifies the image is brighter at those pixels in the measured image than in the reference image. For example, the seventh pixel 80 went from an intensity of 100 to 150, and the twelfth pixel 90 went from an intensity of 130 to 200. FIG. 5 shows a difference image in which the pixel array 66 is again displayed. The difference image may be an image generated by the fire detection device 10, or may simply be a computation of a portion of the fire detection device 10 such as the by the image analyzer 38. The difference image of FIG. 5 shows the light intensity of each pixel that is calculated by taking the measured light intensity of that particular pixel minus the reference light intensity of the same pixel. For example, the first pixel 68 has a difference value of −10 because the first pixel 68 went from a reference value of 20 to a measured value of 10. The seventh pixel 80 has a difference value of 50 (150-100), and the twelfth pixel 90 has a difference value of 70 (200-130). The various differences in all 12 pixels are shown in FIG. 5, and this difference image, if displayed by the fire detection device 10, can be arranged so that positive difference values are white and negative difference values are black. The difference image can be displayed such that if the difference is positive, the pixel in question is white, and if the difference is negative the pixel is black regardless of the intensity level. In other arrangements, the pixel can be displayed darker or lighter based on the measured intensity level of the pixel in question.

The previously described assignment may include a camera 22 and array 66 that is black and white. The setting of the camera 22 may be a black and white setting, or the camera 22 may only be capable of obtaining black and white photographs. In other arrangements, the images captured by the camera 22 can be color images, Here, red, blue, and green components can be captured and held in the pixel array 66. The color or RCB image can be converted by an algorithm into a luminance image and processed in a similar manner as described with respect to the black and white capturing and processing method.

As shown in FIG. 5, some of the differences are positive, some negative, and some unchanged between the reference image and the measured image, Changes that denote an identifiable change in the image are generally clustered around a set of pixels that are contiguous or at least close to one another. For example, the seventh pixel 80, eighth pixel 82, eleventh pixel 88, and twelfth pixel 90 all show significant brightness in the measured image as compared to the reference image. These pixels 80, 82, 88 and 90 are all contiguous or at least close to one another. The significant increases in these close/contiguous pixels 80, 82, 88 and 90 may indicate that a bright item, such as smoke 14, is detected. When smoke 14 is detected the alarm may sound because the fire detection device 10 associates the presence of smoke 14 with the presence of fire 92.

The fire detection device 10 may be arranged to detect the presence of smoke 14 by only using the intensity of light imparted onto the pixel array 66, and not color that is perceived by the camera 22 or any other part of the fire detection device 10 such as the processor 34 or the internal image memory 32. However, it is to be understood that the analysis as to whether smoke 14 is or is not present may in fact include consideration of the color information obtained from the observed image.

Figure 6:
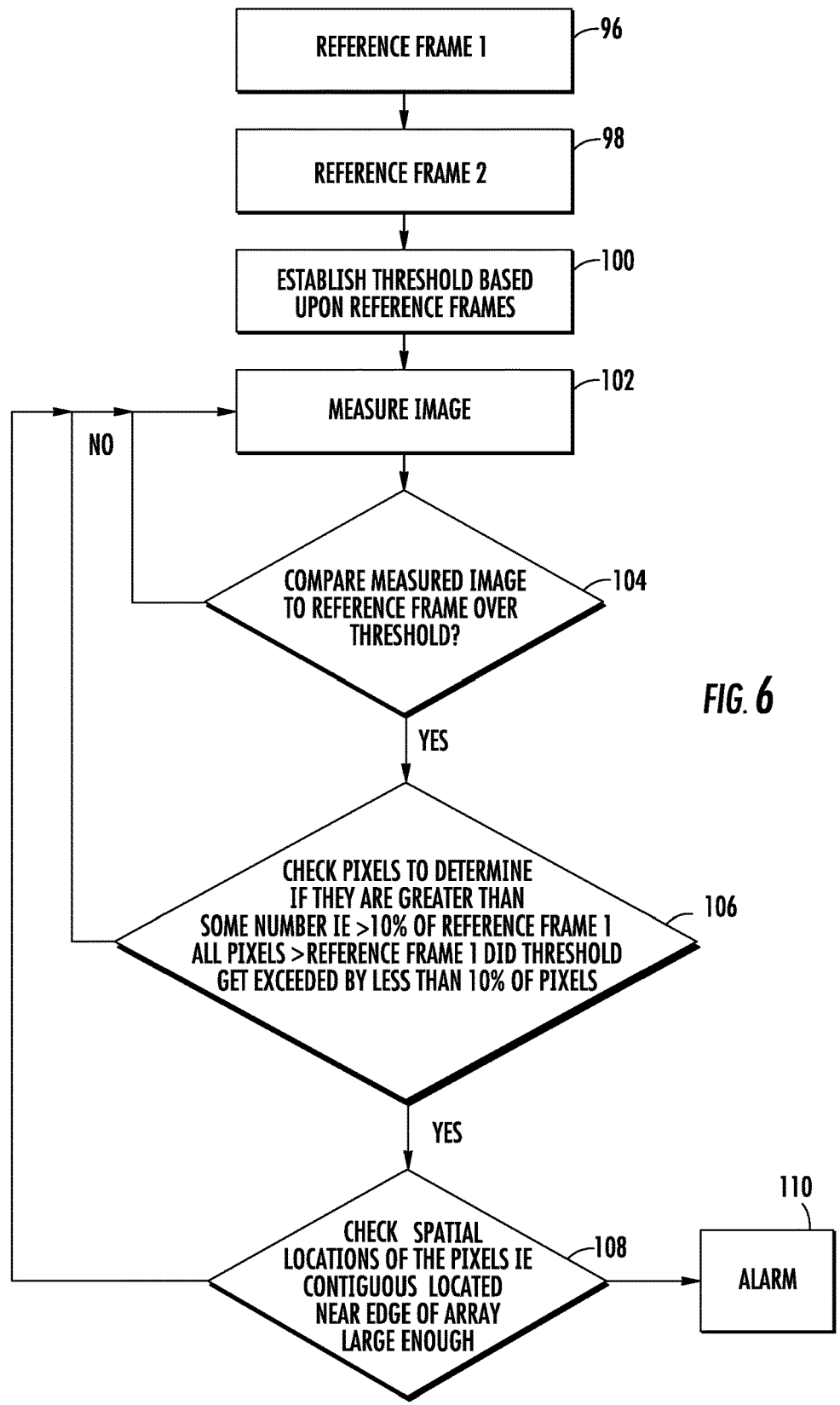
FIG. 6 is a flow chart showing how the fire detection device detects a fire in accordance with one exemplary embodiment.

FIG. 6 shows an analysis of the fire detection system 10 that can be used in order to ascertain the presence of smoke 14 or flames from a fire 92. The analysis may be an algorithm that is executed by the processor 34, or a combination of different processors. The analysis first commences with the establishment of a threshold that is based upon the measurement of one or more reference frames. Even if the image does not change, the camera 22 will probably never register the same intensity on all of the pixels in the pixel array 66 as successive images are taken. This is because vibrations on the table 16, temperature changes, and camera 22 properties all function to create noise in the image capture process. For instance, the camera 22 may have an autofocus, or other mechanical processes, that causes movement and hence variation in brightness observed in the same image between successive frames. As such, it is expected that there will be some naturally occurring noise in the system and the fire detection device 10 may be arranged to alert taking the presence of this noise into account. The autofocus may be turned off in certain arrangements so that the analysis is performed without the image taken by the camera 22 in focus. In other arrangements, the image may in fact be in focus, and the autofocus feature of the camera 22 may be used. Even beyond these reasons for variation, the camera 22 may never register the same intensity on all of the pixels in the pixel array 66 from successive images taken because any photon counting process is inherently a stochastic process and the values may be different from successive images even without any scene change between successive images.

In step 96, a first reference frame 1 is taken by the camera 22. A second reference frame 2 some amount of time later may then be taken by camera 22 at step 98. The comparison function previously described between the pixel arrays 66 of the first and second reference frames may be conducted at analysis step 100. The difference between the frames can be calculated as a total difference in intensity between the first and second reference frames. As such, the total number of photons from the first frame can be subtracted from the total number of photons from the second reference frame to arrive at this difference. Given the nature of the photon counting detection device, the distribution of each pixel in the pixel array 66 would be considered to be Poisson. The differences between each pixel from the first to the second reference frame would be distributed as a Skellam distribution. It is to be understood, however, that this distribution need not be a Skellam distribution in other arrangements. For instance, if a fan or some other movement were within the field of view 26, a Skellam distribution would not be expected. The distribution of pixels in these cases may be estimated empirically by using a few images in which the assumption is made that the scene is stable. This estimated distribution may be used instead.

From this at step 100, the threshold could be set up beyond which a likelihood of observing a pixel difference is low. In one example, for instance, the reference threshold frame 1 photon count at step 96 may be 1 million photons, and the reference threshold frame 2 photon count at step 98 may be 1.2 million photons and the difference may be 0.2 million photons. The threshold in step 100 may be established at 1.5 million photons based upon analysis of the reference threshold frames, in which the difference was 0.2 million photons and the threshold is established as 0.3 million photons thus meaning the threshold is 1.5 million photons from the frame 2 reference frame. Although described as taking only two reference threshold frames, it is to be understood that this is only for sake of example and that multiple reference frames can be measured and used in arriving at the threshold set at step 100. The threshold may be the same for the entire time the fire detection device 10 functions upon start up, or the threshold may be adjusted by taking different reference frame measurements to result in the establishment of new thresholds at different times through the process.

The process may then move onto step 102 in which a measured image is captured. The camera 22 can take a measurement image of the ceiling 18 or other area of the room 12. The successive measurements may be taken every second, every two seconds, or every three seconds. In other arrangements, from 3-5, from 5-30, or up to 120 seconds may take place between successive measurements, Once a measured image is captured by the camera 22, at the next step 104 the measured image is compared to a previous reference image. The reference image may be the one taken in reference frame 1, or may be a reference image that is updated at various intervals through the measurement process. For example, the reference frame can be updated every 5 minutes, every 10 minutes, or every 15 minutes as the fire detection system 10 functions. The reference image may be the same image as the reference frame 1 image, or may be the same image as the reference frame 2 image in accordance with certain embodiments.

The comparison at step 104 may be performed in the manner previously discussed with reference to FIGS. 3-5 in which the total number of photons of the pixels that are different are determined. For instance, the reference frame may have 1 million photons and the measured image may have 1.6 million. The difference is 0.6 million photons which is greater than the established threshold of 0.3 million photons (or total number of 1.5 million photons).

The presence of smoke 14 may cause the image to be brighter and hence additional photons will be present when smoke 14 is present. The smoke 14 may cast a shadow onto the ceiling 18, and cause dark areas and hence fewer photons, but the close placement of the camera 22 to the light source 24 may minimize or eliminate the presence of shadows cast by the smoke 14. The evaluation may only look towards an increase in the number of photons between the measured and reference images and may ignore any decreases. However, it is to be understood that both increases, decreases, and no changes are considered in accordance with various exemplary embodiments.

Figure 8:
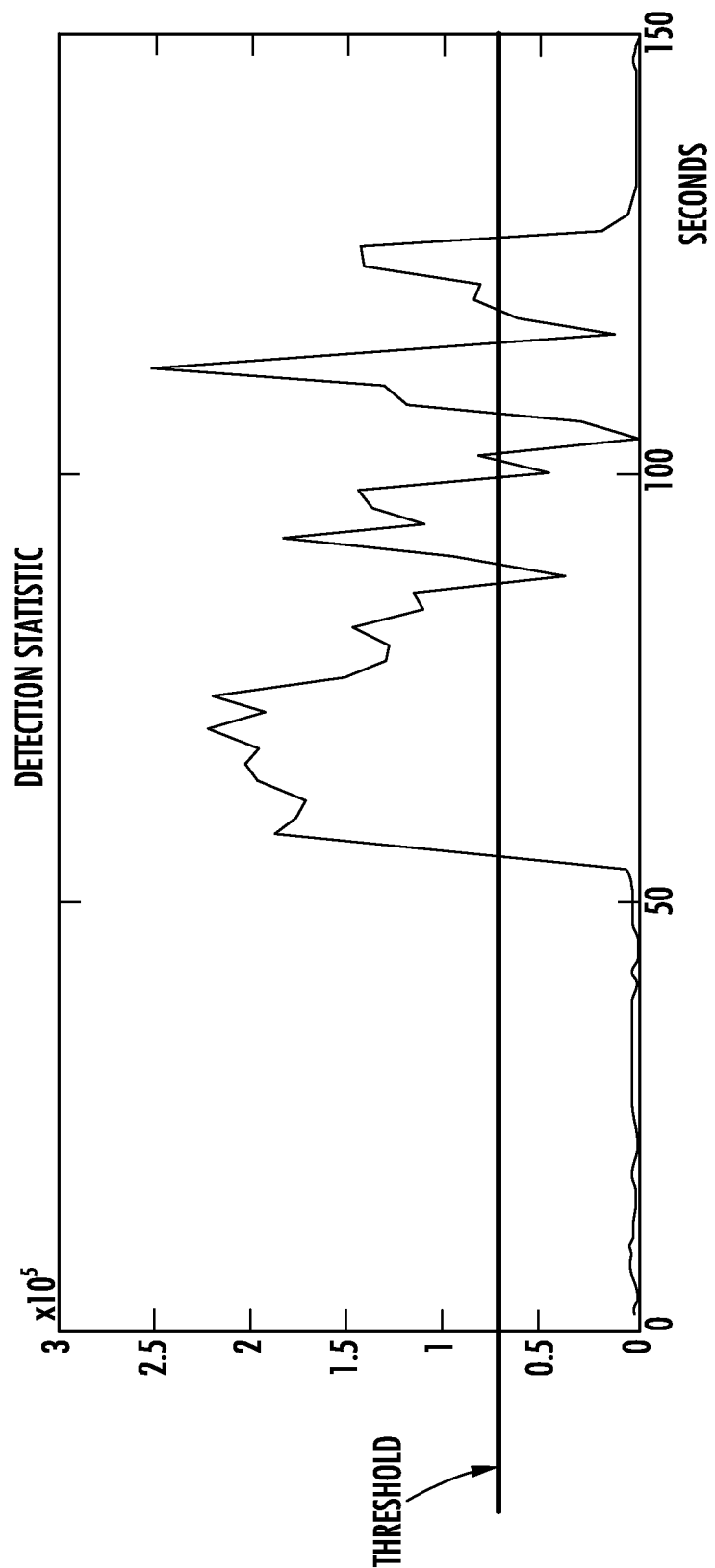
FIG. 8 is a plot of the differences detected between the measured image and the reference image taken over time in accordance with one exemplary embodiment.

The output of the image comparator 40 and image analyzer 38 modules will be a detection statistic, as shown in FIG. 8. This may be as simple as the summed pixel values of the difference image, or a more robust index such as the (a) root-mean-square difference (RMSD), (b) summed absolute values of differences, or (c) a more complex measure that includes the number of contiguous pixels above threshold in the difference image, or the RMSD of contiguous pixels that deviate up or down by more than a threshold value in the difference image. The detection statistic can be calculated in a variety of manners in accordance with different exemplary embodiments, and some of these manners are described in this application at other portions of the application.

FIG. 8 shows a plot of the detection statistic that in this embodiment is the difference between the number of photons in the measured image minus the number of photons in the reference image on the Y-axis versus time on the X-axis. In the example illustrated in FIG. 8, the threshold is set at approximately 60,000 photons which is the difference between the measured minus the reference. Continuous measurement occurs as time increases on the X-axis in which the difference between the total number of photons in the measured image minus the total number of photons in the reference image is plotted. As shown, at around 52 seconds of time, the detection statistic crosses over the established threshold. The analysis at this point may then move onto additional comparisons as will be momentarily discussed in order to determine whether to sound the alarm. It is to be understood that the plot of FIG. 8 need not be generated or displayed during the running of the fire detection system 10 in certain embodiments.

With reference back to Hg. 6, if the threshold is not exceeded in step 104, the process moves back to step 102 and the next image is measured and then subsequently reevaluated in step 104. If the threshold is in fact exceeded in step 104, the system moves on to step 106 in which the pixels of the pixel array 66 are checked in order to determine if they are greater than some number. For example, the system may determine whether 10% or more of the pixels in the measured image have an intensity that is greater than their respective intensities in the reference frame 1. This calculation will be on a pixel by pixel basis and will not be a composite comparison of the intensity of all of the pixels in frame 1 verses all of the pixels in the measured image. Additionally or alternatively, the system may at step 106 determine whether all of the pixels in the measured image have a greater intensity than they did in the reference frame 1. Additionally or alternatively the system may measure at step 106 whether the threshold was exceeded by 10% or fewer of the pixels of the pixel array 66. All three or one of, or any combination of the aforementioned measurements may be taken at step 106 in order to determine whether the pixels are greater than some number. It is to be understood that the percentages mentioned are only exemplary and that others are possible in accordance with other exemplary embodiments.

Although not shown in the flow chart, an additional step may be present at this point of the process. This additional step may involve the camera 22 capturing additional reference frames at a faster pace, that is at shorter intervals of time between frames, than what was captured in the earlier steps 96 and 98. These additional frame captures at shorter time intervals may give additional measurements with which to do more calculations for more precise results. The additional measurements may be used to validate the previously described check at step 106, and if validated the method may go on to step 108. If not validated, the method may be back to step 102. As previously stated, this additional step may be optional and need not be present in other arrangements of the device 10.

If the analysis determines at step 106 that the pixels are not greater than some number, the analysis moves back to step 102. However, if the limit that was established in step 106 is in fact exceeded the process moves on to step 108. Here, location considerations of the pixels from step 106 are taken into account. The location considerations are based upon which specific pixels of the pixel array 66 are identified in step 106. In step 108 the processor 34 may determine whether the pixels identified are contiguous or are spuriously spaced and thus separate from one another. This determination may function to help the device 10 decide whether smoke 14 is present because the identified pixels may be touching if smoke 14 is present and may not be touching if it is not present. In some arrangements, the processor 34 may determine whether greater than fifty percent of the pixels that have increased photon intensity are contiguous. In this regard, greater than 50 percent of the identified pixels are immediately adjacent another identified pixel. In other embodiments, the number may be 60 percent, 70 percent, or up to 90 percent.

Figure 11:
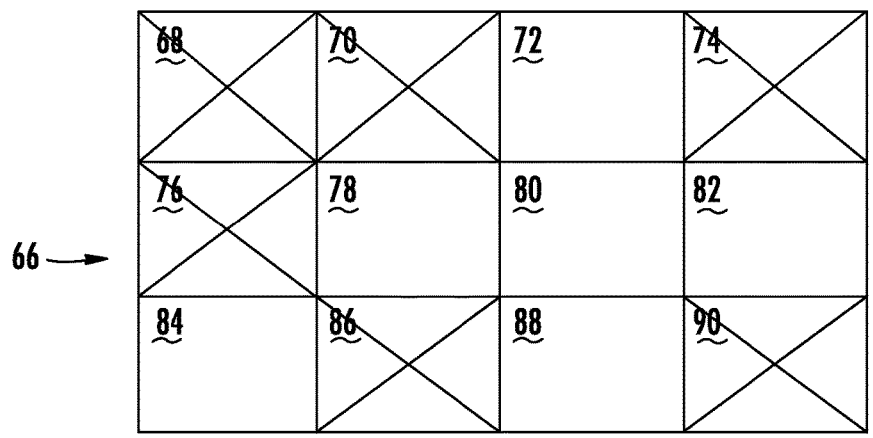
FIG. 11 is a pixel array that shows pixels that are identified and pixels that are not identified.

With reference now to FIG. 11, a pixel array 66 is illustrated in which six of the pixels are identified pixels, and thus are identified as having increased photon intensity. These six pixels are the first pixel 68, the second pixel 70, the fourth pixel 74, the fifth pixel 76, the tenth pixel 86, and the twelfth pixel 90. The first pixel 68, second pixel 70 and fifth pixel 76 are all contiguous because both the second pixel 70 and the fifth pixel 76 border on and engage the first pixel 68. However, the fourth pixel 74 and the twelfth pixel 90 are not contiguous because there are not pixels that are located immediately adjacent them that are likewise designated as identified pixels. The tenth pixel 86 may contiguous in some exemplary embodiments because it is located diagonally across from the fifth pixel 76 and thus may be referred to as contiguous. However, in other embodiments of the system the tenth pixel 86 is not contiguous because the spatial orientation of the tenth pixel 86 is diagonally arranged with respect to the fifth pixel 76 and this is not considered to be contiguous.

Additionally or alternatively, the system at step 108 may seek to determine whether the identified pixels are near the edges of the pixel array 66, This may be indicative of smoke 14 invading the field of view 26 of the camera 22 because smoke 14 will first appear at the edges of the pixel array 66 and not at the center of the pixel array 66. This determination may signify whether a "cloud" of smoke 14 is moving into the field of view 26 from a corner or edge. Still additionally or alternatively in step 108, the processor 34 in step 108 may seek to determine whether the number of identified pixels is large enough. Here, it may be necessary for the pixels that are identified in step 106 to fill in a certain sized area of the pixel array 66, and if they do not then this space requirement of the analysis is not met. In some arrangements, the system may determine whether all or a majority of the identified pixels are located in a region of the pixel array 66 that includes half of the pixels of the pixel array 66 that are farthest from the center of the pixel array 66. In other words, the pixels that are farthest from the center of the pixel array 66 are not the fifty percent of pixels that are closest to the center. If the pixel array 66 is rectangular, the fifty percent of closest pixels may be shaped as a rectangle with the center of the pixel array 66 at its center. The fifty percent of pixels farthest from the center may form a picture frame like border about the pixels that are included as the ones in the closest fifty percent. If all, 75% or greater, 65% or greater, 50% or greater, or 35% or greater of the identified pixels fall within the fifty percent of pixels specially located farthest from the center of the pixel array 66, the system may determine that the space analysis is confirmed for smoke 14.

Figure 12:
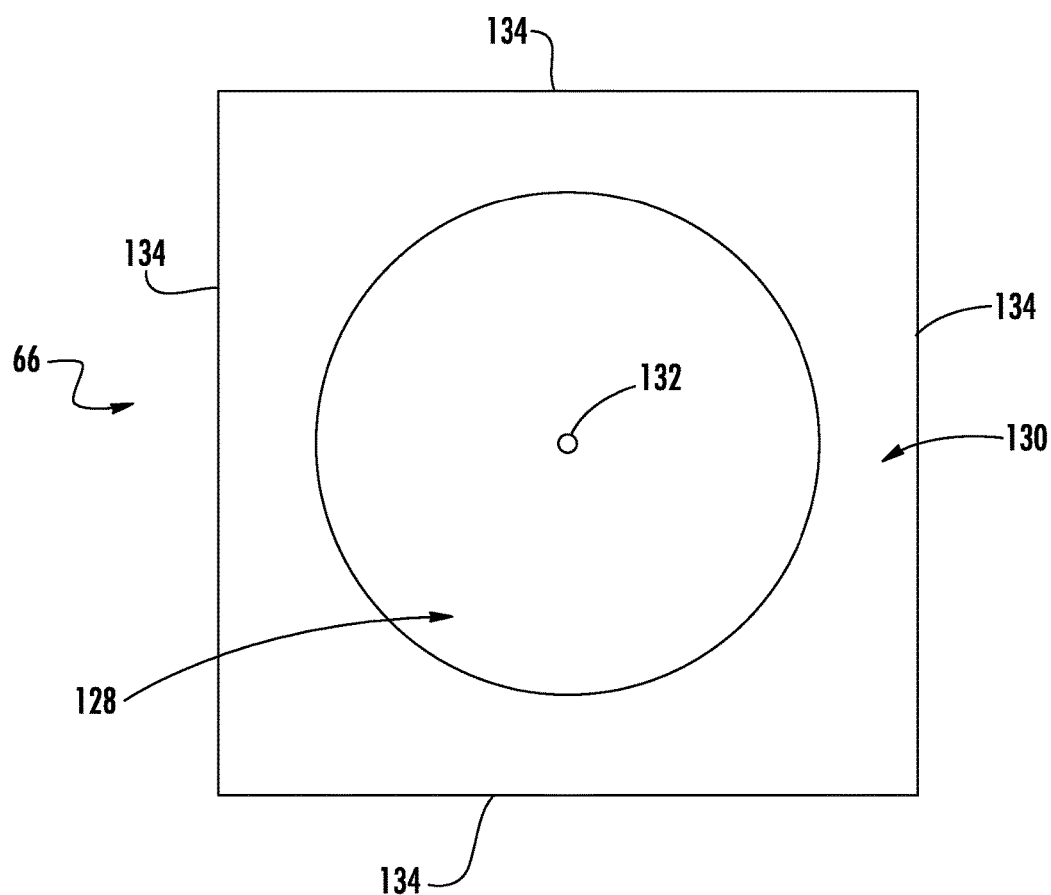
FIG. 12 is a pixel array that shows an area in which fifty percent of the pixels are located that are closer to the center than an area in which the other fifty percent of the pixels are located.

FIG. 12 shows a pixel array 66 but leaves out the pixels for sake of clarity. The pixel array 66 is square shaped, and the pixels may likewise each be in the shape of a square. A center 132 of the pixel array 66 is noted, along with all four of the edges 134 which make up the outer boundary of the entire pixel array 66. A center area 128 of the pixel array 66 is the area in which fifty percent of the pixels of the pixel array 66 are closest to the center 132, This center area 128 may be circular in shape. An outer area 130 of the pixel array includes fifty percent of the pixels of the pixel array that are farthest from the center 132 along any radius from center 132. All pixels in the outer area 130 are more distant along any radius from the center 132 than any pixel in center area 128, The outer area 130 includes the pixels of the pixel array 66 that are generally closest to the edges 134. In some exemplary embodiments, the system may determine whether some number of the identified pixels are in the outer area 130, and if so may cause the space requirement of the system to be met. This number may be 100%, 90%, 80%, 50%, or from 50%-85% in certain exemplary embodiments. Alternately, the system may look at the number of identified pixels that are in the center area 128 and may use this information to determine whether the space requirements of the system are or are not met.

The space analysis in step 108 may employ one, two or any combination of the aforementioned comparisons in order to determine whether the space requirements are met. If this is the case the process will move on to step 110 in which an alarm is triggered to alert the user that smoke 14 is present and thus a fire 92 is present. If the space evaluation of the identified pixels is not determined to be in the affirmative, then the system realizes that no smoke 14 is present and moves once again back to step 102 to continue capturing measurement images. The fire detection device 10 will function for a preset time, or until it is turned off by the user.

Figure 7:
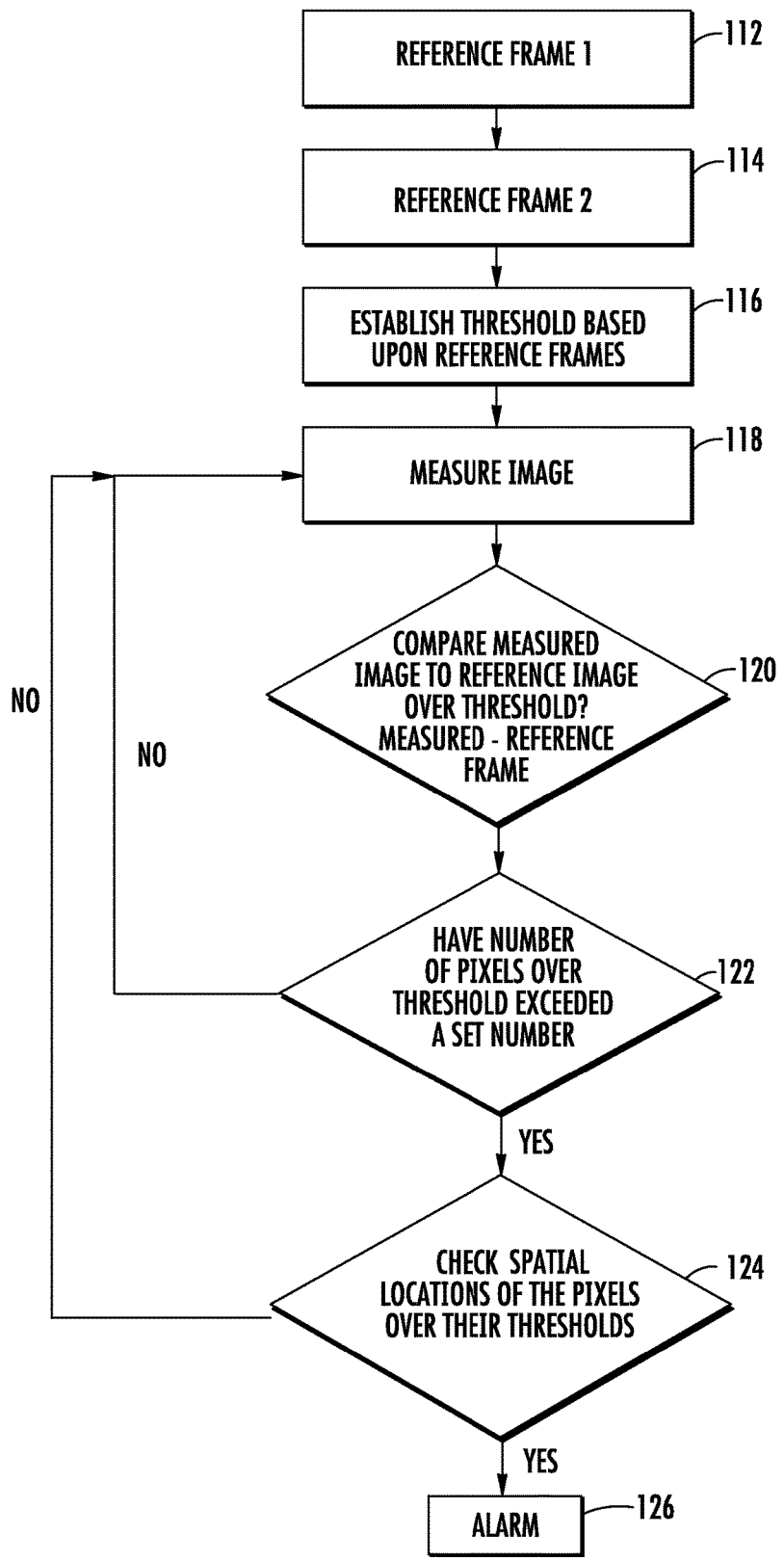
FIG. 7 is a flow chart showing how the fire detection device detects a fire in accordance with a different exemplary embodiment.

The analysis may be different in accordance with other exemplary embodiments of the fire detection device 10. FIG. 7 shows a different analysis of the fire detection device 10 for detecting smoke 14 and fire 92. The analysis starts at step 112 in which a reference frame is taken, Here, the intensity of each pixel of the pixel array 66 is individually measured. For instance, the first pixel 68 may be measured as being 20 photons, the second pixel 70 as being 10 photons, and so on. At step 114, a second reference frame 2 is taken and the same pixels 68 and 70 are again measured, Here, pixel 68 may be 22 photons, and the second pixel 70 may be 12 photons. The remaining individual pixels of the pixel array 66 are likewise measured at the second reference frame 2.

Moving on to step 116, the threshold is established by setting a threshold for each individual pixel of the pixel array 66, This threshold may be set by any statistical process, such as those previously described with respect to steps 96, 98, 100 above. For instance, the threshold for the first pixel 68 may be set at 24 photons based upon a statistical analysis of the levels between the first and second reference frames. The additional pixels of the pixel array 66 may likewise have their own thresholds set which may be different than the threshold of the first pixel 68. The threshold of the second pixel 70 may be 13.

The system may move on to the next step 118 after establishing the thresholds and take images in sequential fashion as the fire detection device 10 continuously monitors the room 12. The timing between successive images may be performed as previously discussed. The system analyzes the measured image at step 120 in which the measured pixel is compared to a reference pixel. The reference pixel may be the intensity of the first pixel 68 at the reference frame in step 112 or 114, or may be a reference pixel that is measured at various timing points through the monitoring. At the comparison step 120 the intensity of the first pixel 68 of the measured image is subtracted from the intensity of the first pixel 68 at the reference image and this difference is compared to the threshold of the first pixel 68 established at the threshold step 116. For instance, if the threshold is 24 photons and the intensity is measured as being 25 photons then the threshold is exceeded and the first pixel 68 is identified as having an exceeded threshold at step 120. The second pixel 70 may be measured as having an intensity of 15 and this number may be above the threshold of 13 that was previously set for the second pixel 70. All of the pixels of the pixel array 66 may be similarly evaluated at step 120 to determine which ones are above their threshold.

The process may then move to step 122 in which a determination is made as to whether the number or percentage of pixels that have exceeded their threshold is above some set number or percentage. For example, the set number may be 40,000 pixels, or may be set at 10%. The set number or percentage may be established independently from the threshold calculation at step 116, or may be established based in whole or in part on the values established at the threshold step 116. The number may be selected as being anywhere from 30,000 to 100,000 pixels, from 100,000 to 500,000 pixels, from 500,000 to 2,000,000 pixels, or up to 5,000,000 pixels. It is to be understood that the aforementioned numbers of pixels are only exemplary and that others can be used in accordance with different exemplary embodiments. If this number/percentage is not exceeded at step 122 then the system moves back to step 118 to continue taking image measurements. If the number/percentage set for the pixels has in fact been exceeded then the process moves on to step 124.

At step 124, the pixels that were determined to be over their respective thresholds at step 120 are evaluated in order to ascertain location and spacing information. This analysis would be the same as described above with respect to step 108 in that the number of the pixels, whether they are contiguous, and whether they do or do not emanate from an edge or corner of the pixel array 66 is looked at to determine if the pixels are indicative of smoke 14 or fire 92. If the pixels that are over their thresholds do satisfy space or size requirements then the system triggers the alarm at step 126. If not, then the system moves back to step 118 for continued monitoring. Again, one or any combination of the various space considerations can be taken into account to determine whether the space requirements at step 124 are met.

It is to be understood that the previously described methods of analysis can be modified in other embodiments. For example, the space requirements in steps 108 and 124 can be eliminated in some arrangements. In other embodiments, the comparison steps 104 and 120 may compare only the top 10% of pixels based upon their photon count so that the 90% of pixels in the image that have the lowest pixel count would not be evaluated at all. This top 10% of pixels would be the ones identified as being the top 10% in the measurement steps 102 and 118.

The previous arrangements have been described with detection of smoke 14 associated with additional photons being detected by the pixel array 66. However, the photons associated with smoke 14 detection need not always be in the positive, or addition of photons, but could be associated with the removal of photons. For example, shadows cast by the smoke 14 onto the ceiling 18 or other surfaces, or the presence of black smoke may cause the image that is measured to be darker than the reference image, and hence fewer photons detected by the fire detection device 10. In this regard, the fire detection device 10 may also have an analysis that looks for the loss of photons in basically the same manners as previously discussed with respect to the increase in photons. The thresholds mentioned may include an upper level and a lower level. The upper level may be associated with an increase in brightness of the pixel, and the lower level is associated with a decrease in brightness of the pixel. If the pixel of the measured image has an intensity higher than the upper level, then the threshold is exceeded. Likewise, if the pixel of the measured image has an intensity lower than the lower level, then the threshold is exceeded. The threshould as described herein may thus have upper and lower limits so that if the measured image is outside of these limits, the threshold is deemed exceeded. Still further, or alternatively, the fire detection device 10 can be arranged so that it looks for changes in the absolute values of photons in the measured images with respect to the reference image. The use of absolute values may be able to take into account both increases and decreases of light intensity caused by the smoke 14. Also, the analysis when using absolute values can be similar to those described above that look for brightness in the measured image versus the reference image.

However, although described as taking all positive and negative changes of the photons into account when seeking to identify smoke 14, some arrangements of the fire detection device 10 only take positive changes into account. In this regard, any negative change between the reference frame and the measurement frame is ignored and plays no part into whether the analysis does or does not detect smoke 14, Only positive changes count. The positive changes are associated with an increase in photons from the reference frame to the measurement frame and thus only an increase in brightness is looked at to determine whether smoke 14 is or is not present. The thresholds in these arrangements may thus have only an upper limit, since a decrease in photon count would be ignored anyway.

Figure 9:
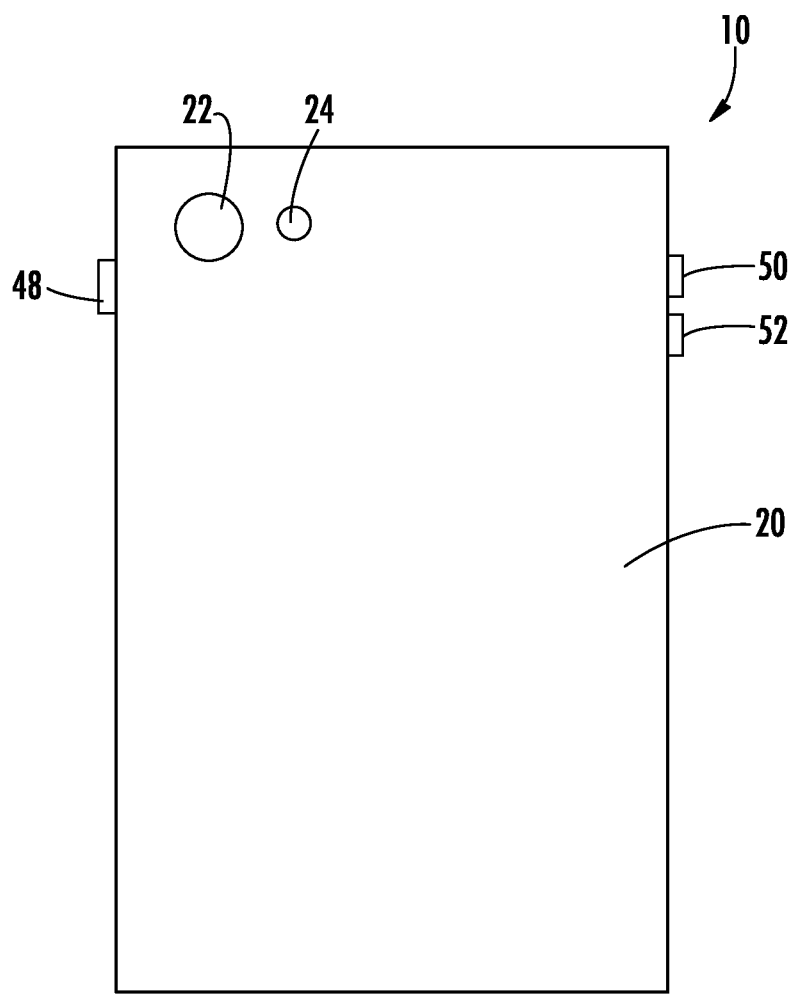
FIG. 9 is a back plan view of a fire detection device as incorporated into a smart phone.

The fire detection device 10 can be a stand-alone device in that the device functions to detect smoke 14 and fire 92 but does not perform any other functions. Alternatively, the fire detection device 10 may be incorporated into another device that is capable of performing other functions. For example, the fire detection device 10 may be incorporated into a cell phone, smart phone, personal digital assistant, or laptop computer. With reference now to FIG. 9, the back surface of a fire detection device 10 is shown that is incorporated into a smart phone. The smart phone has a housing 20 that may be a case into which the smart phone is stored, or may simply be the original housing provided with the smart phone. The processor 34 can be a processor of the smart phone, or may be a processor of a computer remote from the smart phone. The camera 22 and the light source 24 of the smart phone are shown, and may be the camera 22 and the light source 24 that is used by the fire detection device 10 when monitoring for smoke 14, The smart phone is placed onto the upper surface of the table 16 so that the camera 22 and the light source 24 are directed upwards to the ceiling 18 and so that the screen 44 of the smart phone is blocked from view by being positioned facing the upper surface of the table 16 onto which the smart phone is placed. The smart phone may include volume buttons 50 and 52, and a power button 48 for turning the smart phone on and off.

Figure 10:
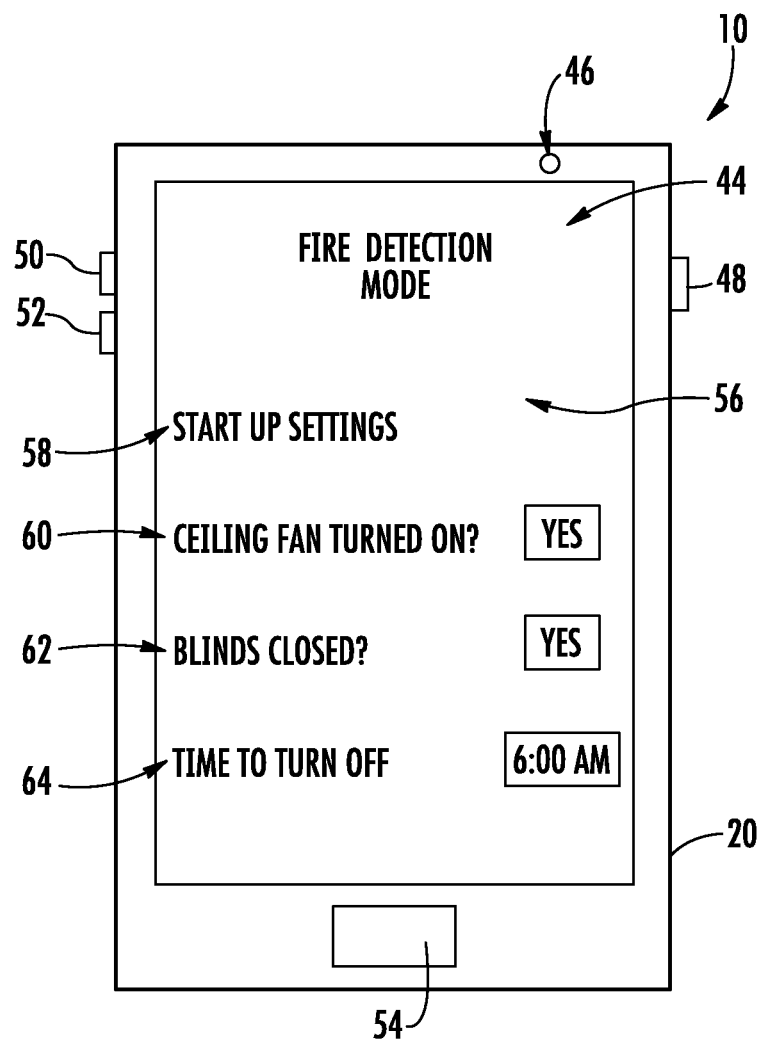
FIG. 10 is a front plan view of the smart phone of FIG. 9.

FIG. 10 shows the front side of the smart phone of FIG. 9 in which the screen 44 displays information relevant to the fire detection device 10. The analysis portion of the fire detection device 10 may be an application, or app, that is downloaded onto the smart phone or otherwise available to the smart phone. The app may control the camera 22 and the light source 24 and can process the information obtained in order to determine whether an alarm should be sounded. If so, the app may instruct the speaker of the smart phone to emit an audible warning, the screen 44 of the smart phone to emit a visual warning, or vibration of the smart phone to activate in order to alert the user that a fire 92 is taking place, Although described as alerting directly at the fire detection device 10, the alarm may be a phone call, text message, or other communication sent over a wired or wireless network to one or more monitoring stations, such as a fire department or a police station. The alarm may be sent to other devices remote from the fire detection device 10 in certain arrangements. The alarm may be sent to any designated individuals or entities such as fire departments, EMS, or police.

The smart phone may have a physical button 54 located on the front face of the smart phone that is used to control certain features of the smart phone and to provide input. The smart phone includes a second camera 46 that can likewise be used to capture images. In this regard, the smart phone could be placed on its back side so that the screen 44 and the second camera 46 point upwards towards the ceiling 18, and away from the upper surface of the table 16. The fire detection device 10 may function so that the second camera 46 acquires the necessary images. A secondary light source 24 may be present as a different device from the smart phone that may be controlled by the smart phone or not controlled by the smart phone. The screen 44 may provide sufficient illumination so as to function as the light source 24. In yet other arrangements, the fire detection device 10 does not employ a light source 24 and may take the images and prepare the analysis without the use of light 28 generated by the fire detection device 10.

The app that may be included in the fire detection device 10 may present certain information on the screen 44 to inform the user of the functioning of the fire detection device 10, and to request information from the user to help the fire detection device 10 identify fire 92. A title 56 of the application can be displayed on the screen 44 in order to inform the user that the smart phone is functioning in fire detection mode. The screen 44 may also present the user with a start-up screen 58 that informs the user that the fire detection device 10 is in is the startup mode. The start-up screen 58 may inform the user that the fire detection device 10 has not yet started imaging the room, and may request input from the user in order obtain information that may better help the fire detection system 10 in determining whether a fire 92 is present.

The start-up screen 58 may request the user enter a first setting 60 that can ask the user whether a ceiling fan is or is not turned on in the room when the fire detection device 10 is functioning to check for a fire 92. The user can use the smart phone to enter a yes or no answer, and the fire detection device 10 can adjust its sensitivity according to whether a ceiling fan is running. The presence of a running ceiling fan may contribute to variations in the lightness and darkness sensed during monitoring.

The start-up screen 58 may also have a second setting 62 that asks the user whether the blinds to the room are open or closed, Open blinds may cause light from the outside to enter the room, and associated movement and shadows may be present within the room that could be imaged by the camera 22. The fire detection device 10 may be programmed with different sensitivity depending upon whether this movement is or is not to be expected in view of the fact that light and other non-fire related movements can be present in the room if the blinds are open. Another third setting 64 may further be presented to the user at the start-up screen 58 which asks the user how long the fire detection device 10 should function in fire detection mode. If the user plans on getting up at 6:00 am, power can be saved by shutting off the fire detection mode at this time, or if movement in the room is expected by the user turning on lights and so forth at 6:00 am then the frequency of false alarms can be minimized or eliminated if the fire detection device 10 is not used when it is not needed.

The fire detection device 10 may be a mobile device that the user can take with him or her to different locations. For example, the user can utilize the fire detection device 10 at different locations when traveling at such times and locations the user needs to sleep. The fire detection device 10 may be designed so that the camera 22, light source 24, and processor 34 are not mounted to a table 16, floor, wall or other surface in a room 12 but are instead separate from such surfaces and not attached. In other arrangements, the fire detection device 10 may in fact be an installed device that is in fact attached to a floor, table, or other surface in a room 12.

The fire detection device 10 may use a camera 22 that is additionally used as a security camera to monitor a room 12, hallway, parking lot, or other location. Images from the camera 22 may thus be used not only to detect fire 92, but to monitor for intruders or other activity. The fire detection device 10 may thus be incorporated into an all ready existing security system. In yet other arrangements, the fire detection device 10 may include some components of a desktop computer. For example, a camera 22 could be incorporated into a desktop computer and used to capture images. The processing of the images may be done by the desktop computer or may be sent to a remote location for processing. The alarm 42 may be sounded at the desktop computer, or may be sounded at a location remote from the desktop computer. As such, in some arrangements the camera 22 may be mobile in that it is incorporated into a device that by nature is moved from place to place, or the camera 22 may be static in that it remains in a single location. In the instance where the camera 22 remains in a single location, it may be rigidly positioned such that it is incapable of moving, or may be capable of being panned and tilted so that different fields of view 26 are possible.

The fire detection device 10 can be employed at facilities such as concert halls, movie theaters, factories, and traffic tunnels to detect fire 92. Still further, the fire detection device 10 may also be used to detect smoke 14 from cigarettes in locations like restaurants and airplanes that prohibit smoking. The fire detection device 10 can be employed in any location in which one desires a determination as to whether fire 92 is or is not present.

The fire detection device 10 as used herein may be capable of detecting smoke 14 and then sounding the alarm because the presence of smoke 14 indicates that a fire 92 is present, Additionally, the fire detection device 10 may also be capable of detecting the flame produced by fire 92 in order to determine that the fire 92 is present. The aforementioned processing steps can be set up to check for brightness associated with a flame of the fire 92 and can sound an alarm if there is a flame detected.

In still further arrangements, the fire detection device 10 is capable of detecting smoke 14 of the fire 92, but cannot and is not capable of detecting the actual flame of the fire 92. The fire detection device 10 may alert that something is happening, flame, without even detecting flame. An alarm may thus be given even though the actual item detected is not even recognized or seen by the device 10. The fire detection device 10 may not take texture or color of the image into account when determining whether smoke 14 is present. In certain arrangements, the fire detection device 10 may only look at intensity of the pixels and location of the pixels relative to the pixel array 66 when looking for smoke 14. In some embodiments, the fire detection device 10 may look for specific properties of smoke 14 and alert based on these properties. For instance, the device 10 may look for how smoke 14 moves across a room 12 in order to determine whether smoke 14 is or is not present when analyzing the captured images. It is to be understood that as used herein, such as in the specification and claims, that the detection of fire 92 can be inferred from the detection of smoke 14 such that the alarm can be generated to alert that fire 92 is present even if only smoke 14 is detected. The device 10 may thus be a fire detection device 10 even if it only detects smoke 14, and not fire 92 directly, or if it detects both smoke 14 and fire 92 directly.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A fire detection device, comprising:
   a camera that captures a reference image and a measured image, the measured image and the reference image each comprising a plurality of pixels, wherein each pixel in the reference image has a corresponding pixel in the measured image; and
   a processor configured to:
   determine an intensity of the reference image defined as a digital numerical quantity indicative of the number of photons of light detected in the reference image;
   (ii) determine an intensity of the measured image defined as a digital numerical quantity indicative of the number of photons of light detected in the measured image;
   (iii) determine the difference between the intensity of the measured image and the intensity of the reference image;
   (iv) determine whether the difference between the intensity of the measured image and the intensity of the reference image exceeds a preselected intensity threshold;
   (v) determine a pixel intensity of each individual pixel in the measure image and the reference image when the difference between the intensity of the measured image and the intensity of the reference image exceeds the preselected intensity threshold, wherein the pixel intensity is defined as a digital numerical quantity indicative of the number of photons of light detected in an individual pixel;
   (vi) determine whether a preselected threshold percentage of pixels in the measured image have an increased pixel intensity compared to the pixel intensity of the corresponding pixel in the reference image;
   (vii) determine the number of contiguous pixels having an increased pixel intensity in the measured image when said preselected threshold percentage of pixels is met;
   (viii) when preselected threshold percentage of pixels is not met, repeat steps (ii)-(vii);
   (ix) when the number of continuous pixels having an increased pixel intensity in the measured image exceeds a preselected number of pixels, indicate the presence of smoke.

2. The fire detection device as set forth in claim 1, wherein the camera is configured to capture a first reference threshold image and a second reference threshold image and the processor is configured to establish the preselected intensity threshold by: (i) determining an intensity of the second reference image defined as a digital quantity indicative of the number of photons of light detected in the second reference threshold image; determining an intensity of the first reference image defined as a digital quantity indicative of the number of photons of light detected in the first reference threshold image; and defining the preselected intensity threshold as the difference between the intensity of the second reference threshold image and the intensity of the first reference threshold image.

3. The fire detection device as set forth in claim 2, wherein the measured image and the second reference threshold image are the same image.

4. The fire detection device as set forth in claim 1, wherein the preselected threshold percentage is at least fifty percent.

5. The fire detection device as set forth in claim 1, wherein the processor is further configured to determine whether the pixels having an increased pixel intensity in the measured image are located in an outer area of the measured image, the outer area being defined as the area of the measured image that includes the half of the pixels of the measured image that are furthest from the center of the measured image, wherein the processor indicates the presence of smoke based on whether a preselected number of pixels having an increased pixel intensity in the outer area of the measured image meets a pre-selected criteria.

6. The fire detection device as set forth in claim 1, wherein the measured image and the reference image are black and white images.

7. The fire detection device as set forth in claim 1, wherein said processor is further configured to (i) determine a pixel intensity difference for each pixel in the measured image as compared to the corresponding pixel in the reference image; (ii) determine whether the pixel intensity difference for each pixel exceeds a preselected pixel intensity threshold for each particular pixel, wherein the processor indicates the presence of smoke based on whether a preselected threshold number of pixels in the measured image exceeds the preselected pixel intensity threshold.

8. The fire detection device as set forth in claim 7, wherein the processor is further configured to base the decision to indicate the presence of smoke on whether the pixels that have exceeded the preselected pixel intensity threshold in the measured image are contiguous with one another such that at least fifty percent are immediately adjacent to another pixel that has exceeded the preselected pixel intensity threshold.

9. The fire detection device as set forth in claim 7, wherein the processor is further configured to determine whether the pixels that have exceeded the preselected pixel intensity threshold in the measured image are located in an outer area of the measured image, the outer area being defined as the area of the measured image that includes the half of the pixels of the measured image that are furthest from the center of the measured image, wherein the processor indicates the presence of smoke based on whether a preselected number of pixels exceeding the preselected pixel intensity threshold in the outer area of the measured image meets a pre-selected criteria.

10. The fire detection device as set forth in claim 7, wherein the processor is further configured to calculate a detection statistic based on an analysis of a pattern selected from the group consisting of:
    (a) a spatial pattern of the pixels that exceed the pixel intensity threshold for each particular pixel;
    (b) a temporal pattern of pixels that exceed the pixel intensity threshold for each particular pixel in a series of measured images; and
    (c) both a spatial pattern of the pixels that exceed the pixel intensity threshold for each particular pixel and a temporal pattern of pixels that exceed the pixel intensity threshold for each particular pixel in a series of measured images.

11. The fire detection device as set forth in claim 7, wherein the processor is further configured to: (i) identify a subset of pixels in the measured image having the highest intensity; (ii) compare the pixel intensity of each of the pixels in the subset of the measured image to the pixel intensity of the corresponding pixel of the reference image to define a pixel intensity difference for each of the pixels in the subset; and (iii) determine if the pixel intensity difference for each of the pixels in the subset exceeds the preselected pixel intensity threshold, wherein the pixel intensity threshold may be the same or different for each pixel in the subset, and wherein the processor indicates the presence of smoke based on the result of step (iii).

12. The fire detection device as set forth in claim 11, wherein the processor is further configured to determine whether the number of pixels having a pixel intensity difference that exceeds the preselected pixel intensity threshold is greater than a preselected threshold number of pixels, wherein the processor indicates the presence of smoke based on whether the preselected threshold number of pixels is exceeded.

13. The fire detection device as set forth in claim 11, wherein the number of pixels in the subset does not exceed 10% of the total pixels of the measured image.

14. The fire detection device as set forth in claim 1, further comprising a light source that emits light into a field of view of the camera.

15. The fire detection device as set forth in claim 14, wherein the camera, the light source, and the processor are all components of a smart phone.

16. The fire detection device as set forth in claim 1, wherein the camera is configured to capture a series of reference images at a first rate, and wherein when the percentage threshold is exceeded, capture a second series of references images at a second rate, wherein the second rate is faster than the first rate.

17. The fire detection device as set forth in claim 14, further comprising a screen that displays information about the fire detection device and obtains instructions from a user of the fire detection device that are communicated to the processor.

18. The fire detection device as set forth in claim 1, wherein the processor is configured to determine the intensity of the measured image and the intensity of the reference image based on a subset of pixels in the measured image, the subset comprising those pixels having an intensity above a threshold intensity.

\* \* \* \* \*